(12) United States Patent
Wang et al.

(10) Patent No.: US 10,816,950 B2
(45) Date of Patent: Oct. 27, 2020

(54) METHOD, DEVICE AND STORAGE MEDIUM FOR EVALUATING PHYSICAL POTENTIAL OF DEMAND RESPONSE FOR FEEDER LINE

(71) Applicants: CHINA ELECTRIC POWER RESEARCH INSTITUTE COMPANY LIMITED, Beijing (CN); STATE GRID CORPORATION OF CHINA, Beijing (CN); STATE GRID SHANDONG ELECTRIC POWER RESEARCH INSTITUTE, Jinan, Shandong (CN)

(72) Inventors: Ke Wang, Beijing (CN); Taiyou Yong, Beijing (CN); Jianguo Yao, Beijing (CN); Shengchun Yang, Beijing (CN); Yijun Yu, Beijing (CN); Yaping Li, Beijing (CN); Shuhai Feng, Beijing (CN); Jiantao Liu, Beijing (CN); Dan Zeng, Beijing (CN); Jing Zhou, Beijing (CN); Xiaorui Guo, Beijing (CN); Wenbo Mao, Beijing (CN); Gang Wang, Beijing (CN)

(73) Assignees: CHINA ELECTRIC POWER RESEARCH INSTITUTE COMPANY LIMITED, Beijing (CN); STATE GRID CORPORATION OF CHINA, Beijing (CN); STATE GRID SHANDONG ELECTRIC POWER RESEARCH INSTITUTE, Shandong (CN)

( * ) Notice: Subject to any disclaimer, the term of this patent is extended or adjusted under 35 U.S.C. 154(b) by 98 days.

(21) Appl. No.: 15/763,666

(22) PCT Filed: Jun. 13, 2017

(86) PCT No.: PCT/CN2017/088135
§ 371 (c)(1),
(2) Date: Mar. 27, 2018

(87) PCT Pub. No.: WO2017/215599
PCT Pub. Date: Dec. 21, 2017

(65) Prior Publication Data
US 2019/0049910 A1    Feb. 14, 2019

(30) Foreign Application Priority Data

Jun. 15, 2016    (CN) .......................... 2016 1 0424996

(51) Int. Cl.
*G05B 19/048*    (2006.01)
*G06Q 50/06*    (2012.01)
(Continued)

(52) U.S. Cl.
CPC ......... *G05B 19/048* (2013.01); *G05B 19/042* (2013.01); *G06F 16/11* (2019.01);
(Continued)

(58) Field of Classification Search
CPC ........ G06Q 10/06; G06Q 50/06; G06F 16/11; G05B 19/048; G05B 19/042
See application file for complete search history.

(56) References Cited

U.S. PATENT DOCUMENTS 10,120,004 B1 * 11/2018 Tsai ........................ G06F 15/00
2011/0196546 A1   8/2011 Muller et al.
(Continued)

FOREIGN PATENT DOCUMENTS

| CN | 105404784 A | 3/2016 |
|---|---|---|
| CN | 105405061 A | 3/2016 |

(Continued)

OTHER PUBLICATIONS

International Search Report in international application No. PCT/CN2017/088135, dated Sep. 14, 2017.
(Continued)

*Primary Examiner* — Vincent H Tran
(74) *Attorney, Agent, or Firm* — Arent Fox LLP; Michael Fainberg

(57) ABSTRACT

A Demand Response (DR) physical potential evaluation method for a feeder line is provided, which includes that: a
(Continued)

load curve of a part to be identified in a load curve of a feeder line to be evaluated is acquired; a load database is created on the basis of a historical load curve of loads of predefined types; load types and total number of the loads to be identified are determined on the basis of the load curve of the part to be identified and the load database; a physical potential of the loads of each of the types is acquired according to the load types of the loads to be identified; and an overall aggregated physical potential of the loads to be identified is obtained according to the physical potential of the loads of each of the types and a number of the loads of each of the types.

16 Claims, 3 Drawing Sheets

(51) Int. Cl.
　　*G06Q 10/06*　　　(2012.01)
　　*G05B 19/042*　　　(2006.01)
　　*G06F 16/11*　　　(2019.01)
(52) U.S. Cl.
　　CPC ............ *G06Q 10/06* (2013.01); *G06Q 50/06* (2013.01); *G05B 2219/2639* (2013.01)

(56) References Cited

U.S. PATENT DOCUMENTS

| | | | |
|---|---|---|---|
| 2013/0110425 A1* | 5/2013 | Sharma | H02J 3/26 |
| | | | 702/62 |
| 2013/0238151 A1* | 9/2013 | Vaum | G05B 15/00 |
| | | | 700/286 |
| 2016/0161932 A1* | 6/2016 | Shao | G06Q 50/06 |
| | | | 700/291 |
| 2017/0364043 A1* | 12/2017 | Ganti | G05B 15/02 |
| 2018/0260920 A1* | 9/2018 | Saratsis | G06Q 50/163 |
| 2018/0351362 A1* | 12/2018 | Zhu | H02J 3/32 |

FOREIGN PATENT DOCUMENTS

| | | |
|---|---|---|
| CN | 103559655 B | 5/2016 |
| CN | 106096844 A | 11/2016 |

OTHER PUBLICATIONS

The Written Opinion of the International Search Authority in international application No. PCT/CN2017/088135, dated Sep. 14, 2017.

* cited by examiner

METHOD, DEVICE AND STORAGE MEDIUM FOR EVALUATING PHYSICAL POTENTIAL OF DEMAND RESPONSE FOR FEEDER LINE

CROSS-REFERENCE TO RELATED APPLICATIONS

The present application is the U.S. National Stage Application of International Patent Application No. PCT/CN2017/088135, filed on Jun. 13, 2017, which claims benefit of Chinese Patent Application No. 201610424996.8, filed on Jun. 15, 2016. The contents of each of these applications are hereby incorporated by reference in their entirety.

TECHNICAL FIELD

The disclosure relates to the technical field of automated analysis of power systems, and particularly, to a method, device and storage medium for evaluating physical potential of Demand Response (DR) for a feeder line.

BACKGROUND

Rapid development of smart grids makes a DR resource important means for improving a regulation capability of a power grid, and DR potential evaluation is a foundation for making a reasonable DR policy or electricity price mechanism.

At present, DR potentials of a single equipment, a single business or single residential building are reported frequently. However, compared with individual loads or single buildings, a power company pays more attentions to DR scheduling potentials of generatrix nodes and large-scale feeder lines after aggregation of a large number of loads. For a problem about DR physical potential evaluation of a generatrix node or a large-scale feeder line, there is yet no effective solution at present.

SUMMARY

In order to solve the problem about DR physical evaluation of a generatrix node or a large-scale feeder line, an embodiment of the disclosure discloses a method for evaluating physical potential of DR for a feeder line, which includes that:

a load curve of a part to be identified from a load curve of a feeder line to be evaluated is acquired;

a load database is created on the basis of a historical load curve of loads of predefined types;

load types and total number of the loads to be identified are determined on the basis of the load curve of the part to be identified and the load database;

a physical potential of the loads of each of the types is acquired according to the load types of the loads to be identified; and an overall aggregated physical potential of the loads to be identified is obtained according to the physical potential of the loads of each of the types and a number of the loads of each of the types.

In the solution, the operation that the load curve of the part to be identified in the load curve of the feeder line to be evaluated is acquired includes that:

a load curve of the feeder line to be evaluated within a predetermined time is acquired through an Energy Management System (EMS) of a power grid;

a load curve of identifiable loads is extracted from the load curve; and the load curve of the part to be identified is obtained on the basis of the load curve of the feeder line within the predetermined time and the load curve of the identifiable loads.

In the solution, the operation that the load database is created on the basis of the historical load curve of the loads of the predefined types includes that:

the load database of the loads of the predefined types is created on the basis of the historical load curve of the loads of the predefined types in a corresponding climatic region to establish association relationships between the loads of the predefined types and weather and time.

In the solution, the operation that the load types and total number of the loads to be identified are determined on the basis of the load curve of the part to be identified and the load database includes that:

whether the load database includes the load curve of the loads of the predefined types corresponding to the climatic region where the feeder line to be evaluated is located within the predetermined time is judged;

if YES, the load types and total number of the loads to be identified are directly identified by adopting a predetermined identification manner; and if NO, the load curve of the loads of the predefined types is generated by software (for example, EnergyPlus software) simulation on the basis of time and external weather information data corresponding to the load curve of the loads to be identified, and the load curve of the loads of the predefined types is identified in the predetermined identification manner.

In the solution, the operation that the physical potential of the loads of each of the types is acquired according to the load types of the loads to be identified includes that:

a physical potential of DR of the loads of each of the types is obtained by simulation on the basis of the association relationships between the loads of the predefined types and the weather and time.

In the solution, the operation that the overall aggregated physical potential of the loads to be identified is obtained according to the physical potential of the loads of each of the types and the total number of the loads of each of the types includes that:

an overall aggregated response potential $DR_{BSP,h}$ of loads of the feeder line within a time period h is calculated according to a formula:

$$DR_{BSP,h}=\Sigma_{k=1}^{N_b}x_k DR_{k,h},$$

where $x_k$ represents a total number of loads k, and $N_b$ represents a total number of types of the loads.

An embodiment of the disclosure further provides a device for evaluating physical potential of DR for a feeder line, which includes: a processor and a memory having stored therein a computer program which is executable on the processor, wherein the processor is configured to run the computer program to perform the method for evaluating physical potential of DR for the feeder line.

An embodiment of the disclosure further provides a computer storage medium having stored therein computer-executable instructions for performing the method for evaluating physical potential of DR for the feeder line.

The technical solutions provided by the embodiments of the disclosure have at least the following beneficial effects:

According to the DR potential evaluation method disclosed by the embodiments of the disclosure for the feeder line, a load composition of a large-scale feeder line is identified by using load data of a climatic region where the feeder line is located, and an overall DR physical potential of the feeder line is evaluated, so that the problem that a load composition of a large-scale feeder line of a power system is unlikely to be effectively identified due to existence of problems about measurement cost, network model inaccuracy, system ownership and the like is solved, and the DR physical potential of the feeder line may be quickly provided to lay a foundation for making a reasonable Demand Side Management (DSM) policy and mechanism.

DETAILED DESCRIPTION

The inventor finds in a research process that a DR scheduling potential of a large-scale feeder line depends on load composition identification over the large-scale feeder line, wherein load composition identification mainly includes Intrusive Load Monitoring (ILM) and Nonintrusive Load Monitoring (Non-ILM). For effectively solving a problem about DR physical potential evaluation of a generatrix node or a large-scale feeder line, an embodiment of the disclosure provides a load composition identification-based DR physical potential evaluation method for a large-scale feeder line on the basis of the concept of Non-ILM.

In order to clearly introduce the technical solutions provided by the disclosure, the technical solutions will be specifically described below in combination with the drawings.

An embodiment of the disclosure discloses a DR potential evaluation method for a feeder line. The feeder line may be a large-scale feeder line of an urban power grid, a database of loads of predefined types is created by using changes and characteristics of load curves of typical loads in a corresponding climatic region in different seasons, dates and time, and on such a basis, a load composition of a feeder line node is calculated by using an optimization method, and an overall physical response potential is evaluated.

Figure 1:
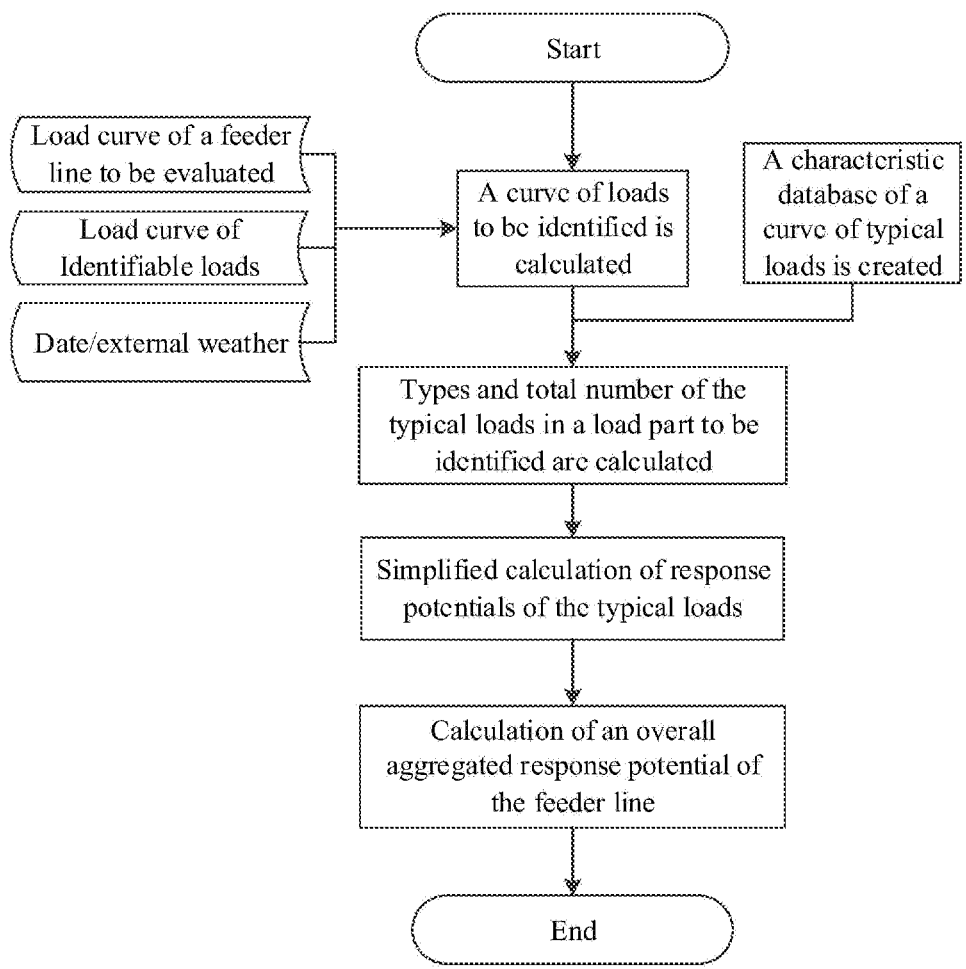
FIG. 1 is a flowchart of DR potential evaluation for a feeder line according to an embodiment of the disclosure.

FIG. 1 shows an evaluation flowchart. The evaluation method provided by the disclosure includes the following steps.

In (1), a load curve of a part to be identified in a load curve of a feeder line to be evaluated is acquired, including the following steps.

In Step a, a load curve of the feeder line to be evaluated within a predetermined time (in an embodiment, the predetermined time may be a week, including workdays and non-workdays) is acquired through an EMS of a power grid.

In Step b, a load curve of identifiable loads in the load curve is directly acquired through the EMS system installed by a user or a measuring device at a point of interaction with the power grid.

In Step c, subtraction is performed on the load curve obtained in Step a and the load curve of the identifiable loads obtained in Step b to obtain the load curve of the part to be identified in the load curve of the feeder line to be evaluated.

In (2), a load database is created.

A load database of loads of predefined types is created on the basis of a historical load curve of the loads of the predefined types (if there is none, the load curve of the loads of the predefined types may be simulated by using Energy-Plus software) in a corresponding climatic region, association relationships between the loads of the predefined types and weather and time are established, and main characteristic parameters of the curve of the loads of the predefined types are further calculated.

The load database of the loads of the predefined types may be represented as:

$$\varphi = \{\varphi_1, \ldots, \varphi_k, \ldots, \varphi_{N_{PB}}\} \quad (1), \text{ and}$$

$$\varphi_k = (P_{k,base}^{WD} f_{k,1}^{WD} f_{k,2}^{WD} f_{k,3}^{WD}, P_{k,base}^{WE} f_{k,1}^{WE}, f_{k,2}^{WE} f_{k,3}^{WE}) \quad (2).$$

In the formulae, $N_{PB}$ is a total number of load types in the climatic region where the feeder line to be evaluated is located, $\varphi_k$ is a characteristic set of a load curve of loads k of the predefined types, and includes a workday basic value power set $P_{k,base}^{WD}$ and non-workday basic value power set $P_{k,base}^{WE}$ of the loads within a predetermined time period (for example, a year), $f_{k,1}^{WD}$, $f_{k,2}^{WD}$ and $f_{k,3}^{WD}$ are association parameter sets describing power and external temperature within 24 hours of a workday, and $f_{k,1}^{WE}$, $f_{k,2}^{WE}$ and $f_{k,3}^{WE}$ are association parameter sets about power and external temperature within 24 hours of a non-workday.

The load database includes main load types in the climatic region where the feeder line to be evaluated is located, and may effectively reflect influence of seasons, dates and an external environmental factor on an electric load curve. Here, the loads types are described: there are totally included 16 types of businesses and 3 types of residential buildings, the businesses include large-sized office buildings, middle-sized office buildings, small-sized office buildings, warehouses, retail stores, strip business streets, primary schools, junior middle schools, supermarkets, fast restaurants, restaurants, hospitals, community hospitals, small-scale hotels, large-scale hotels and multi-story apartments, and the residential buildings include a basic type, a low type and a high type.

In (3), load types and total number of the loads to be identified are determined by calling a predetermined load identification policy on the basis of the load curve of the part to be identified and the load database.

In an embodiment, the predetermined load identification policy may be a predetermined load identification optimization algorithm.

Figure 2:
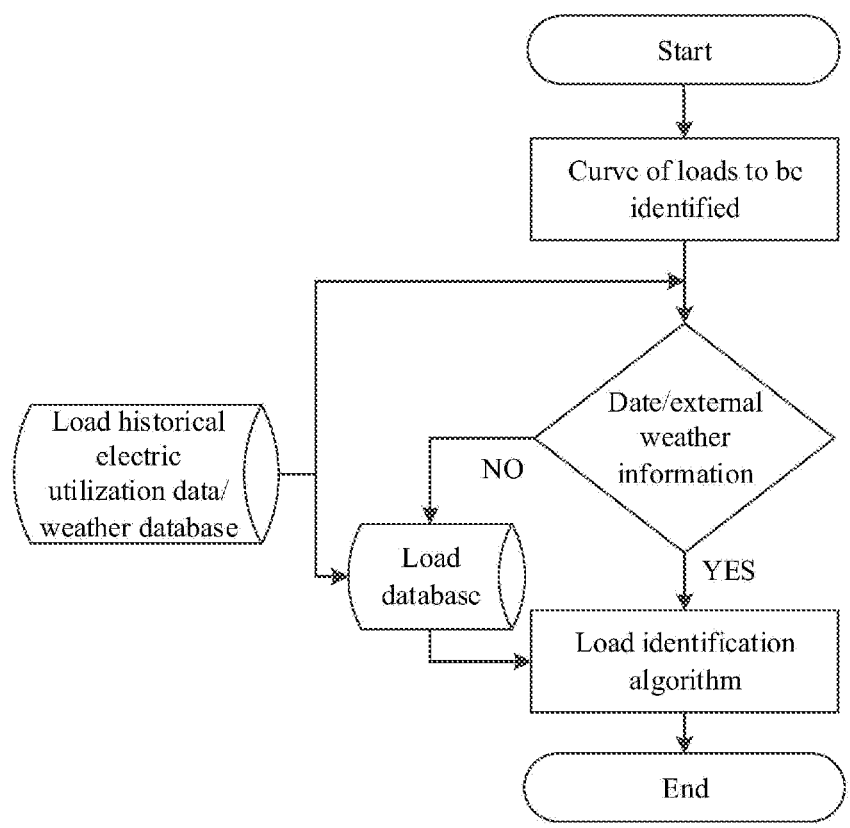
FIG. 2 is a flowchart of a load identification optimization algorithm according to an embodiment of the disclosure.

FIG. 2 shows a flowchart of the load identification optimization algorithm. The algorithm includes the following steps.

In Step S1, whether the load database of the loads of the predefined types includes the load curve of the loads of the predefined types corresponding to the climatic region where the feeder line to be evaluated is located within the predetermined time is judged.

If YES, the load curve of the loads of the predefined types is directly identified by adopting a predetermined identification manner to obtain the load types and total number of the loads to be identified.

Here, the predetermined identification manner may be a predetermined least square method, and in an embodiment, includes that:

the load database of the loads of the predefined types, the curve of the loads to be identified and external environmental parameters, such as a temperature and a humidity, of the specific climatic region are known, and load types of the feeder line to be identified and a number of the loads of each of the types are solved, which may be represented as:

$$\min_{\overline{X}} \sum_{t=t1}^{t2} \varepsilon[\Omega(t, \Delta E), \phi(t)], \quad (3)$$

where $\phi(t)$ is a load signal to be identified, $\Omega(\cdot)$ is an electric load generated by superposition of a load composition estimated by a load separation algorithm, and $\varepsilon[.]$ is a calculation error between an estimated value and a practical value.

Here, during a practical application, the load database of the loads of the predefined types includes all building types which may exist, except uncertain impact loads, in the researched climatic region.

If NO, Step S2 is executed.

In Step S2, the load curve of the loads of the predefined types is generated by adopting the load database and time and external weather information data corresponding to the load curve of the loads to be identified, and the load curve of the loads of the predefined types is identified in the predetermined identification manner.

Here, the operation that the load curve of the loads of the predefined types is generated by adopting the load database and the time and external weather information data corresponding to the load curve of the loads to be identified includes:

$$P_{k,t}^{PB} = P_{k,t}^{base}(T_{p,0}) + \Delta P_{k,t}(\Delta T_p) = P_{k,t}^{base}(T_{p,0})[1 + f_{k,t}(\Delta T_p)] \quad (4), \text{ and}$$

$$f_{k,t}(\Delta T_p) = f_{k,t}^{1} \Delta T_p^{2} + f_{k,t}^{2} \Delta T_p + f_{k,t}^{3} \quad (5),$$

where $\Delta T_p$ is a temperature deviation relative to a baseline temperature $T_{p,0}$, $P_{k,t}^{base}$ is basic value power at a moment t, $f_{k,1,t}$, $f_{k,2,t}$ and $f_{k,3,t}$ are association parameter sets about the power and the external temperature, and as shown in the formula (2), the parameters are different in the workdays and the non-workdays.

In Step S3, load types of the load part to be identified are calculated by using the least square method to make an error between the load curve formed by superposition of the loads separated from the load curve and the curve of the loads to be identified minimum.

In Step S4, load type and number results obtained by identification of this time are output, and the next step is executed.

In (4), a physical potential of DR of the loads of each of the types is obtained by simulation on the basis of the association relationships between the loads of the predefined types and the weather and time.

Here, during the practical application, simulation may be EnergyPlus software simulation, and includes that:

a DR potential $DR_{k,h}$ of a building k within a time period h is calculated according to a formula:

$$DR_{k,h} = +\hat{P}_{k,h}^{base} - \hat{P}_{k,h}^{DR} \quad (6),$$

where $\hat{P}_{k,h}^{base}$ is a baseline load of the load k within the time period h, and $\hat{P}_{k,h}^{DR}$ a is a practical load curve of the load after a DR event.

Figure 3:
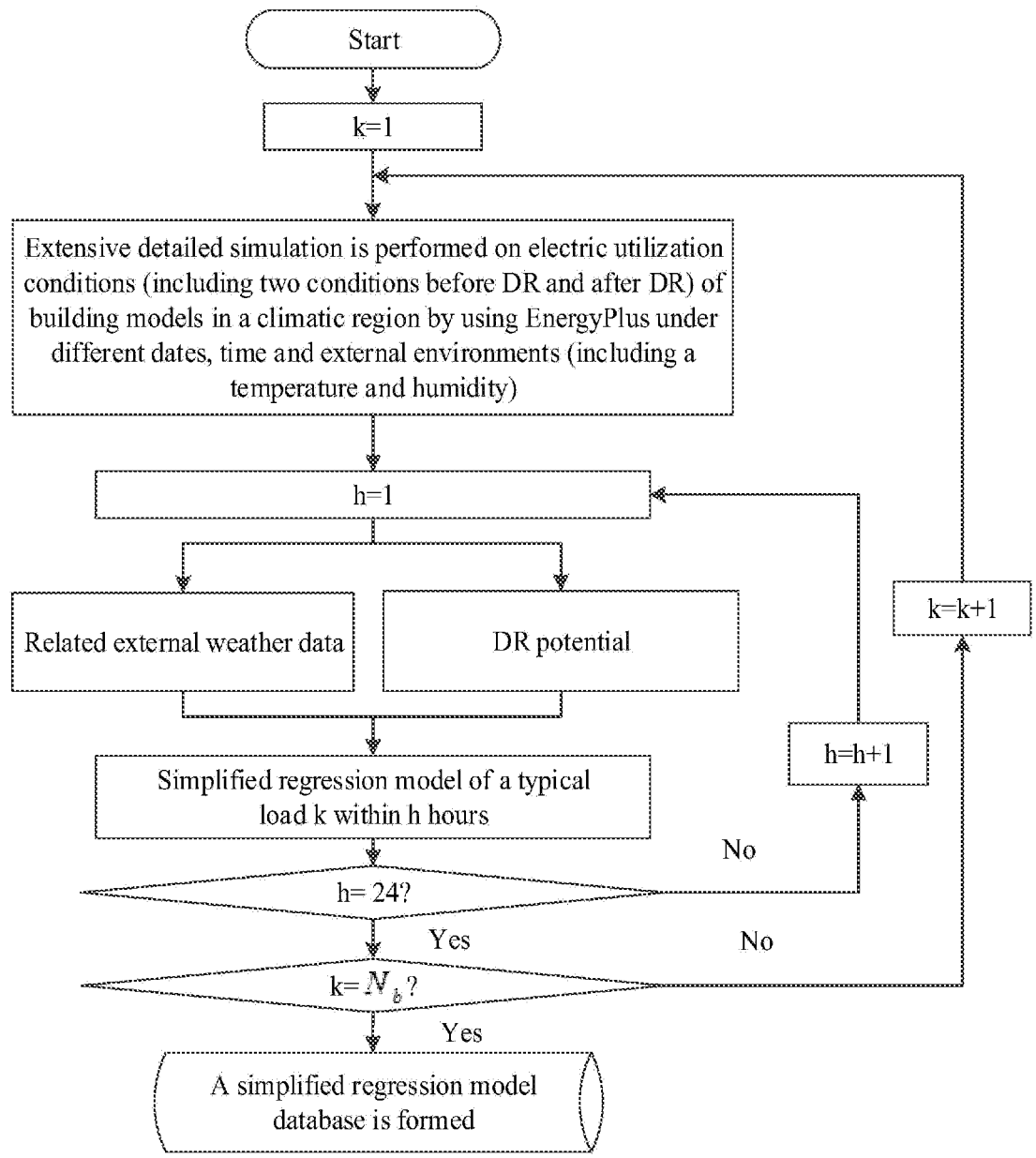
FIG. 3 is a schematic diagram of a generation manner for a simplified regression model database according to an embodiment of the disclosure.

In another implementation mode, the physical potential of DR of the loads of each of the types is obtained by simulation with the a pre-generated simplified regression model database, as shown in FIG. 3, including the following operation:

it is found according to a large amount of historical data or EnergyPlus simulation data that a piecewise linear regression model may be adopted to establish a relationship model between an environmental temperature and a DR:

$$DR_{k,h}\% = \alpha_{1,h}^{k} + \beta_{1,h}^{k} OAT_h, OAT_h \leq T_1^{bp}$$

$$DR_{k,h}\% = \alpha_{2,h}^{k} + \beta_{2,h}^{k} OAT_h, T_1^{bp} < OAT_h < T_2^{bp}$$

$$DR_{k,h}\% = \alpha_{3,h}^{k} + \beta_{3,h}^{k} OAT_h, OAT_h \geq T_2^{bp},$$

where $DR_{k,h}\%$ is a percentage of the DR potential of the load k in baseline loads in the time period h, $\alpha_{1,h}^{k}$, $\alpha_{2,h}^{k}$, $\alpha_{3,h}^{k}$, $\beta_{1,h}^{k}$, $\beta_{2,h}^{k}$, $\beta_{3,h}^{k}$ are parameters related to the time period h respectively, $OAT_h$ is an environmental temperature of the time period h, and $T_1^{bp}, T_2^{bp}$ are piecewise points related to the time period h respectively.

In (5), an overall aggregated physical potential of the loads to be identified is obtained according to the physical potential of the loads of each of the types and the total number of the loads of each of the types.

An overall aggregated response potential $DR_{BSP,h}$ of the loads of the feeder line within the time period h is calculated according to a formula:

$$DR_{BSP,h} = \sum_{k=1}^{N_b} x_k DR_{k,h},$$

where $x_k$ represents a number of the loads k, and $N_b$ represents a total number of types of the loads.

An embodiment of the disclosure further provides a DR physical potential evaluation device for a feeder line, which includes: a processor and a memory having stored therein a computer program which is executable on the processor, wherein the processor is configured to run the computer program to perform operations of:

acquiring a load curve of a part to be identified from a load curve of a feeder line to be evaluated;

creating a load database on the basis of a historical load curve of loads of predefined types;

determining load types and total number of the loads to be identified on the basis of the load curve of the part to be identified and the load database;

acquiring a physical potential of the loads of each of the types according to the types of the loads to be identified; and obtaining an overall aggregated physical potential of the loads to be identified according to the physical potential of the loads of each of the types and a total number of the loads of each of the types.

In an embodiment, the processor is configured to run the computer program to perform:

acquiring a load curve of the feeder line to be evaluated within a predetermined time through an EMS of a power grid;

extracting a load curve of identifiable loads from the load curve; and obtaining the load curve of the part to be identified on the basis of the load curve within the predetermined time and the load curve of the identifiable loads.

In an embodiment, the processor is configured to run the computer program to perform:

creating the load database of the loads of the predefined types on the basis of the historical load curve of the loads of the predefined types in a corresponding climatic region to establish association relationships between the loads of the predefined types and weather and time.

In an embodiment, the processor is configured to run the computer program to perform:

judging whether the load database includes the load curve of the loads of the predefined types corresponding to the climatic region where the feeder line to be evaluated is located within the predetermined time;

if YES, directly identifying the load curve of the loads of the predefined types by adopting a predetermined identification manner to obtain the load types and total number of the loads to be identified; and if NO, generating the load curve of the loads of the predefined types by adopting the load database and time and external weather information data corresponding to the load curve of the loads to be identified, and identifying the load curve of the loads of the predefined types in the predetermined identification manner.

In an embodiment, the processor is configured to run the computer program to perform:

obtaining a physical potential of DR of the loads of each of the types by simulation on the basis of the association relationships between the loads of the predefined types and the weather and time.

In an embodiment, the processor is configured to run the computer program to perform:

calculating an overall aggregated response potential $DR_{BSP,h}$ of loads of the feeder line within a time period h according to a formula:

$$DR_{BSP,h} = \sum_{k=1}^{N_b} x_k DR_{k,h},$$

where $x_k$ represents a total number of loads k, and $N_b$ represents a total number of types of the loads.

An embodiment of the disclosure further provides a computer storage medium having stored therein computer-executable instructions for performing the method for evaluating physical potential of DR for the feeder line.

The above embodiments are adopted to not limit but only describe the technical solutions of the disclosure. Although the disclosure has been described with reference to the embodiments in detail, those skilled in the art may still make modifications or equivalent replacements to specific implementation modes of the disclosure, and any modifications or equivalent replacements made without departing from the spirit and scope of the disclosure fall within the scope of protection of the claims of the disclosure applying for approval.

INDUSTRIAL APPLICABILITY

According to the embodiments of the disclosure, the load curve of the part to be identified in the load curve of the feeder line to be evaluated is acquired; the load database is created on the basis of the historical load curve of the loads of the predefined types; the load types and total number of the loads to be identified are determined on the basis of the load curve of the part to be identified and the load database; the physical potential of the loads of each of the types is acquired according to the load types of the loads to be identified; and the overall aggregated physical potential of the loads to be identified is obtained according to the physical potential of the loads of each of the types and the total number of the loads of each of the types. Therefore, DR physical potentials of loads of a large-scale feeder line may be effectively evaluated.

The invention claimed is:

1. A method for evaluating physical potential of Demand Response (DR) for a feeder line, executed by a device for evaluating the physical potential of DR for the feeder line comprising a processor and a memory, the method comprising:

acquiring a load curve of loads to be identified from a load curve of a feeder line to be evaluated;

creating a load database on the basis of a historical load curve of loads of predefined types;

determining load types and total number of the loads to be identified on the basis of the load curve of the loads to be identified and the load database, wherein determining the load types and total number of the loads to be identified on the basis of the load curve of the loads to be identified and the load database comprises: judging whether the load database comprises the load curve of the loads of the predefined types corresponding to the climatic region where the feeder line to be evaluated is located within the predetermined time; if YES, directly identifying the load types and total number of the loads to be identified by adopting a predetermined identification manner; and if NO, generating the load curve of the loads of the predefined types by software simulation on the basis of time and external weather information data corresponding to the load curve of the loads to be identified, and identifying the load curve of the loads of the predefined types in the predetermined identification manner;

acquiring a physical potential of the loads of each of the types according to the types of the loads to be identified; and obtaining an overall aggregated physical potential of the loads to be identified according to the physical potential of the loads of each of the types and a total number of the loads of each of the types.

2. The method as claimed in claim 1, wherein acquiring the load curve of the loads to be identified from the load curve of the feeder line to be evaluated comprises:

acquiring a load curve of the feeder line to be evaluated within a predetermined time through an Energy Management System (EMS) of a power grid;

extracting a load curve of identifiable loads from the load curve; and obtaining the load curve of the loads to be identified on the basis of the load curve of the feeder line to be evaluated within the predetermined time and the load curve of the identifiable loads.

3. The method as claimed in claim 2, wherein creating the load database on the basis of the historical load curve of the loads of the predefined types comprises:

creating the load database of the loads of the predefined types on the basis of the historical load curve of the loads of the predefined types in a corresponding climatic region to establish association relationships between the loads of the predefined types and weather and time.

4. The method as claimed in claim 1, wherein creating the load database on the basis of the historical load curve of the loads of the predefined types comprises:

creating the load database of the loads of the predefined types on the basis of the historical load curve of the loads of the predefined types in a corresponding climatic region to establish association relationships between the loads of the predefined types and weather and time.

5. The method as claimed in claim 1, wherein acquiring the physical potential of the loads of each of the types according to the load types of the loads to be identified comprises:

obtaining a physical potential of DR of the loads of each of the types by simulation on the basis of the association relationships between the loads of the predefined types and the weather and time.

6. The method as claimed in claim 1, wherein obtaining the overall aggregated physical potential of the loads to be identified according to the physical potential of the loads of each of the types and the total number of the loads of each of the types comprises:

calculating an overall aggregated response potential $DR_{BSP,h}$ of loads of the feeder line within a time period h according to a formula:

$$DR_{BSP,h}=\Sigma_{k=1}^{N_b}x_k DR_{k,h},$$

where $x_k$ represents a total number of loads k, and $N_b$ represents a total number of types of the loads.

7. A device for evaluating physical potential of Demand Response (DR) for a feeder line, comprising: a processor and a memory having stored therein a computer program which is executable on the processor, wherein the processor is configured to run the computer program to perform operations of:

acquiring a load curve of loads to be identified from a load curve of a feeder line to be evaluated;

creating a load database on the basis of a historical load curve of loads of predefined types;

determining load types and total number of the loads to be identified on the basis of the load curve of the loads to be identified and the load database, wherein determining the load types and total number of the loads to be identified on the basis of the load curve of the loads to be identified and the load database comprises: judging whether the load database comprises the load curve of the loads of the predefined types corresponding to the climatic region where the feeder line to be evaluated is located within the predetermined time; if YES, directly identifying the load types and total number of the loads to be identified by adopting a predetermined identification manner; and if NO, generating the load curve of the loads of the predefined types by software simulation on the basis of time and external weather information data corresponding to the load curve of the loads to be identified, and identifying the load curve of the loads of the predefined types in the predetermined identification manner;

acquiring a physical potential of the loads of each of the types according to the types of the loads to be identified; and obtaining an overall aggregated physical potential of the loads to be identified according to the physical potential of the loads of each of the types and a total number of the loads of each of the types.

8. The device as claimed in claim 7, wherein the processor is configured to run the computer program to perform:

acquiring a load curve of the feeder line to be evaluated within a predetermined time through an Energy Management System (EMS) of a power grid;

extracting a load curve of identifiable loads from the load curve; and obtaining the load curve of the loads to be identified on the basis of the load curve of the feeder line to be evaluated within the predetermined time and the load curve of the identifiable loads.

9. The device as claimed in claim 7, wherein the processor is configured to run the computer program to perform:

creating the load database of the loads of the predefined types on the basis of the historical load curve of the loads of the predefined types in a corresponding climatic region to establish association relationships between the loads of the predefined types and weather and time.

10. The device as claimed in claim 7, wherein the processor is configured to run the computer program to perform:

obtaining a physical potential of DR of the loads of each of the types by simulation on the basis of the association relationships between the loads of the predefined types and the weather and time.

11. The device as claimed in claim 7, wherein the processor is configured to run the computer program to perform:

calculating an overall aggregated response potential $DR_{BSP,h}$ of loads of the feeder line within a time period h according to a formula:

$$DR_{BSP,h}=Y_{k=1}^{N_b}x_k DR_{k,h}$$

where $x_k$ represents a total number of loads k, and $N_b$ represents a total number of types of the loads.

12. A non-transitory computer storage medium having stored therein computer-executable instructions for performing a method for evaluating physical potential of Demand Response (DR) for the feeder line by a device for evaluating the physical potential of DR for the feeder line comprising a processor and a memory, the method comprising:

acquiring a load curve of loads to be identified from a load curve of a feeder line to be evaluated;

creating a load database on the basis of a historical load curve of loads of predefined types;

determining load types and total number of the loads to be identified on the basis of the load curve of the loads to be identified and the load database, wherein determining the load types and total number of the loads to be identified on the basis of the load curve of the loads to be identified and the load database comprises: judging whether the load database comprises the load curve of the loads of the predefined types corresponding to the climatic region where the feeder line to be evaluated is located within the predetermined time; if YES, directly identifying the load types and total number of the loads to be identified by adopting a predetermined identification manner; and if NO, generating the load curve of the loads of the predefined types by software simulation on the basis of time and external weather information data corresponding to the load curve of the loads to be identified, and identifying the load curve of the loads of the predefined types in the predetermined identification manner;

acquiring a physical potential of the loads of each of the types according to the types of the loads to be identified; and obtaining an overall aggregated physical potential of the loads to be identified according to the physical potential of the loads of each of the types and a total number of the loads of each of the types.

13. The non-transitory computer storage medium as claimed in claim 12, wherein acquiring the load curve of the loads to be identified from the load curve of the feeder line to be evaluated comprises:

acquiring a load curve of the feeder line to be evaluated within a predetermined time through an Energy Management System (EMS) of a power grid;

extracting a load curve of identifiable loads from the load curve; and obtaining the load curve of the loads to be identified on the basis of the load curve of the feeder line to be evaluated within the predetermined time and the load curve of the identifiable loads.

14. The non-transitory computer storage medium as claimed in claim 12, wherein creating the load database on the basis of the historical load curve of the loads of the predefined types comprises:
creating the load database of the loads of the predefined types on the basis of the historical load curve of the loads of the predefined types in a corresponding climatic region to establish association relationships between the loads of the predefined types and weather and time.

15. The non-transitory computer storage medium as claimed in claim 12, wherein acquiring the physical potential of the loads of each of the types according to the load types of the loads to be identified comprises:
obtaining a physical potential of DR of the loads of each of the types by simulation on the basis of the association relationships between the loads of the predefined types and the weather and time.

16. The non-transitory computer storage medium as claimed in claim 12, wherein obtaining the overall aggregated physical potential of the loads to be identified according to the physical potential of the loads of each of the types and the total number of the loads of each of the types comprises:
calculating an overall aggregated response potential $DR_{BSP,h}$ of loads of the feeder line within a time period h according to a formula:

$$DR_{BSP,h} = \Sigma_{k=1}^{N_b} x_k DR_{k,h},$$

where $x_k$ represents a total number of loads k, and $N_b$ represents a total number of types of the loads.

* * * * *